United States Patent
Franchi et al.

(10) Patent No.: US 11,113,522 B2
(45) Date of Patent: Sep. 7, 2021

(54) SEGMENT-BASED PATTERN MATCHING ALGORITHM

(71) Applicant: Datalogic IP Tech S.R.L., Calderara di Reno (IT)

(72) Inventors: Alessandro Franchi, Bologna (IT); Leonardo Mora, Mogliano (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 160 days.

(21) Appl. No.: 16/271,260

(22) Filed: Feb. 8, 2019

(65) Prior Publication Data
US 2019/0244021 A1 Aug. 8, 2019

Related U.S. Application Data

(60) Provisional application No. 62/627,844, filed on Feb. 8, 2018.

(51) Int. Cl.
*G06K 9/00* (2006.01)
*G06K 9/62* (2006.01)
*G06K 9/48* (2006.01)

(52) U.S. Cl.
CPC ..... *G06K 9/00536* (2013.01); *G06K 9/00523* (2013.01); *G06K 9/48* (2013.01); *G06K 9/6204* (2013.01); *G06K 2209/03* (2013.01); *G06K 2209/19* (2013.01); *G06K 2209/25* (2013.01)

(58) Field of Classification Search
CPC ...... G06K 9/4609; G06K 9/48; G06K 9/6204; G06K 9/6211; G06K 9/00617; G06K 9/6203; G06K 9/00523; G06K 9/00536

USPC ........................................................ 382/224
See application file for complete search history.

(56) References Cited

U.S. PATENT DOCUMENTS

| | | | |
|---|---|---|---|
| 7,831,098 B2 | 11/2010 | Melikian | |
| 9,406,138 B1* | 8/2016 | St-Pierre | ............... G06T 7/13 |
| 9,495,607 B2 | 11/2016 | Tombari et al. | |
| 2015/0049955 A1* | 2/2015 | Stoeffler | ............... G06K 9/4671 382/220 |

(Continued)

OTHER PUBLICATIONS

Shi et al., "Sift Feature Point Matching Based on Improved RANSAC Algorithm", 2013 Fifth International Conference on Intelligent Human-Machine Systems and Cybernetics, 2013 IEEE.

*Primary Examiner* — Kenny A Cese
(74) *Attorney, Agent, or Firm* — Foley & Lardner LLP

(57) ABSTRACT

A system and method for matching a pattern may include generating a set of model descriptors representative of segment features of a first imaged object. A set of query descriptors representative of segment features of a second imaged object may be generated. A first model segment may be selected to align with the query segments to determine if any of the query segments correspond with the first model segment based on respective model descriptors and query descriptors. An hypothesis may be generated by computing a transformation to match the selected first model descriptor with a query descriptor. The hypothesis may be validated by a model fitting algorithm when comparing other transformed model descriptors with other query descriptors. Based on a consensus value from the model fitting algorithm, a determination as to whether a pattern match exists between the first and second images may be made.

20 Claims, 5 Drawing Sheets

(56) References Cited

U.S. PATENT DOCUMENTS

2015/0078629 A1* 3/2015 Gottemukkula ........ G06T 11/60
                                                   382/117
2016/0358355 A1* 12/2016 Lin ..................... G06K 9/4638

* cited by examiner

SEGMENT-BASED PATTERN MATCHING ALGORITHM

RELATED APPLICATIONS

This application claims benefit of priority from U.S. Provisional Application having Ser. No. 62/627,844 filed on Feb. 8, 2018; the contents of which are hereby incorporated by reference in their entirety.

TECHNICAL FIELD

The present invention relates to pattern matching, and in particular, using a segment-based pattern matching algorithm with fast hypotheses validation in performing the pattern matching.

BACKGROUND

Manufacturing and other processes may use machine vision techniques in performing certain tasks. With the use of robotics and other machinery to perform manufacturing and other tasks (e.g., mobile robotics), the ability for a machine to identify an object using pattern matching has become a critical element in the use of robotics. The use of pattern matching allows for locating areas of image that are similar to a template image. For example, an object (e.g., machine part, logo, etc.) that is to be identified in an image scene to enable a machine to manipulate or otherwise interact or avoid interaction with the object may have a template image of the object stored by a machine to enable the machine to identify the object during operation. Pattern matching is important because correctly identifying an object is a first step in many machine vision applications, such as manufacturing, quality control, robot navigation, and so on.

Historically, pattern matching techniques generally use a "brute force" search technique, whereby an image model is constructed starting from a reference template image. Thereafter, a matching process involves (i) moving the model to all possible positions in a query image and (ii) computing a similarity score at each location. One problem is that the higher the invariants level required (e.g., translation, rotation, scaling, etc.), the larger the pose space that must be explored because all rotated and scaled variants of the model needs to be tested by performing similarity scoring. Certain techniques to speed up searching have been used, but the full pose space must be processed, and, as such, computational cost is very high. In other words, the speed at which pattern matching occurs using conventional pattern matching techniques is slow, which, of course, limits throughput of a machine vision system. As such, there is a need to increase the speed of the pattern matching process.

BRIEF SUMMARY

To overcome the problems with conventional pattern matching solutions, a completely different approach to pattern matching that uses a line segment detector algorithm that is robust against geometric transformations, noise, and illumination changes may be utilized. The pattern matching algorithm may be based on a segment alignment process. Given a pair of segments, a candidate alignment may be performed (i.e., a transformation that aligns the two segments). The algorithm may use a consensus-based hypotheses validation or model fitting algorithm to quickly discard wrong candidate matches. The process is also intrinsically translation, rotation, and scale invariant due to the use of oriented segments. The process may be optimized for speed, as well.

One embodiment of a computer-implemented method for matching a pattern may include generating a set of model descriptors representative of segment features of a first object captured in a first image. A set of query descriptors representative of segment features of a second object captured in a second image may be generated. A first model segment may be selected to align with the query segments to determine if any of the query segments correspond with the first model segment based on respective model descriptors and query descriptors. An hypothesis may be generated by computing a transformation to match the selected first model descriptor with a query descriptor. The hypothesis may be validated by performing a model fitting algorithm when comparing other transformed model descriptors with other query descriptors. Based on a consensus value from the model fitting algorithm, a determination as to whether a pattern match exists between the first and second images may be made.

One embodiment of an imaging system may include an imaging camera and a processing unit in communication with the imaging camera. The processing unit may be configured to generate a set of model descriptors representative of segment features of a first object captured in a first image. A set of query descriptors may be generated from a second object captured in a second image. A first model segment may be selected to align with the query segments to determine if any of the query segments correspond with the first model segment based on respective model descriptors and query descriptors. An hypothesis may be generated by computing a transformation to match the selected first model descriptor with a query descriptor. The hypothesis may be validated by performing a model fitting algorithm when comparing other transformed model descriptors with other query descriptors. Based on a consensus value from the model fitting algorithm, a determination as to whether a pattern match exists between the first and second images may be made.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
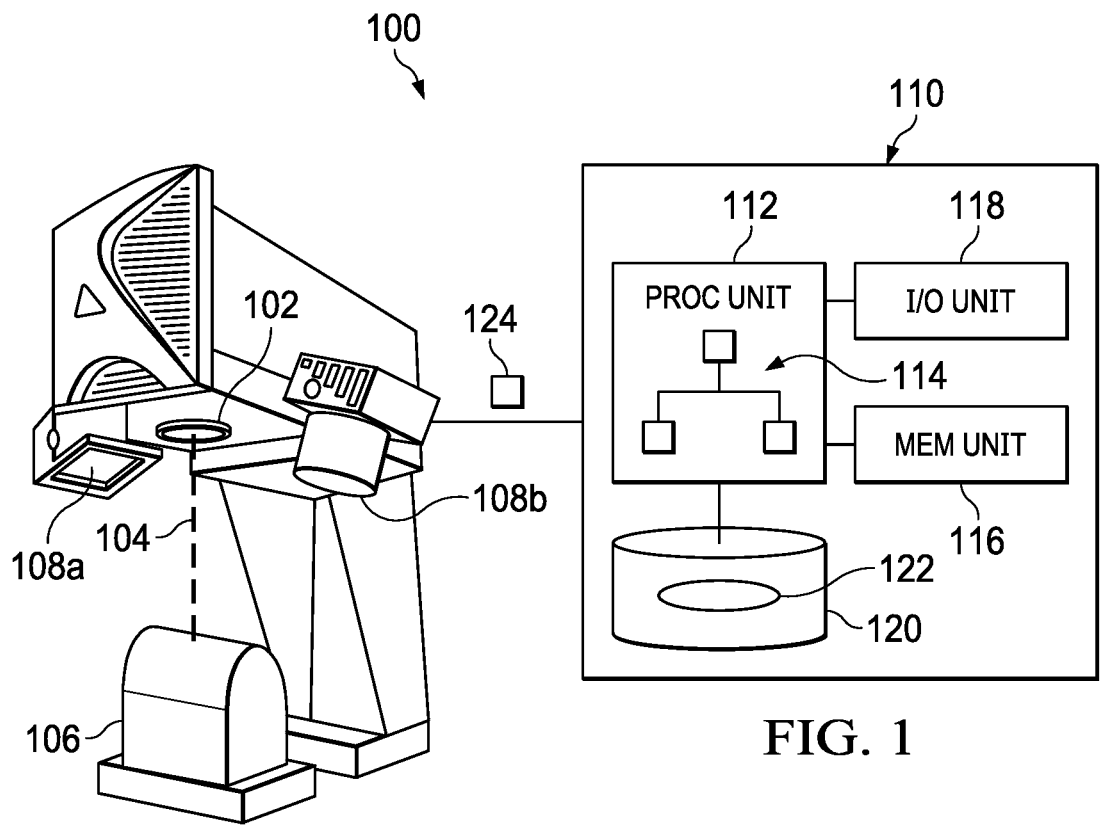
FIG. 1 is an illustration of an illustrative system used to perform pattern matching.

With regard to FIG. 1, an illustration of an illustrative system 100 using machine vision that includes pattern matching is shown. The system 100 may be any system, such as a part manufacturing device, that uses machine vision for performing actions. In an embodiment, the system 100 is a laser marking system that is configured to perform direct part marking (DPM), as understood in the art. In performing the laser marking, a laser marker 102 outputs a laser beam 104 onto a part 106 to perform direct part marking (DPM) may be used. The DPM may be a code (e.g., quick reference (QR) code), graphic (e.g., logo), text, or other image disposed on a part. The indicia may alternatively be a print that is disposed directly on a part, package, shipping container, or anything else. One or more imaging cameras 108a and 108b (collectively 108) may be used to image the part 106 to assist with the DPM process. The positions of the cameras 108 are illustrative, and it should be understood that a single camera may be utilized. In an embodiment, one or more of the cameras 108 may be positioned adjacent the laser marker 102 such that a more perpendicular image may be captured of the part or an indicia that is DPM marked on the part, attached (e.g., sticker) to the part, or positioned near the part (e.g., on a handling tray). The cameras 108 may further be configured to have a sufficient field-of-view so as to capture the entire part to perform machine vision of the entire or partial shape of the part.

Although the system 100 is shown as a piece of equipment for performing manufacturing, the machine vision principles described herein may be deployed on any system, such as a mobile system (e.g., autonomous vehicle, humanoid, drone, police car, etc.) or stationary system (e.g., surveillance monitoring, x-ray system, other production equipment, robotic system, image scanning system, etc.). The machine vision may be performed to identify DPM indicia, printed indicia, and/or object shapes irrespective of orientation, as further described herein.

The system 100 may further include a computer processing system 110 that includes a processing unit 112 that executes software 114. The processing unit 112 may include one or more processors configured to process a variety of commands and data, such as images and/or signals, captured by the cameras 108 and/or other sensors (not shown). The processors may be general processors, image processors, digital signal processors, application specific integrated circuit (ASIC), any other logical circuit, or combination thereof. The software 114 may perform machine vision processes, such as pattern matching, as further described herein. The computer processing system 110 may be in communication with a non-transitory memory unit 116, input/output (I/O) unit 118, and storage unit 120. The storage unit 120 may be a hard drive or solid-state memory in which a data repository 122 may be configured to store data, such as image data 124, that may be received from the system 100 in performing machine vision, as further described herein.

I. Segment Description

Figure 2:
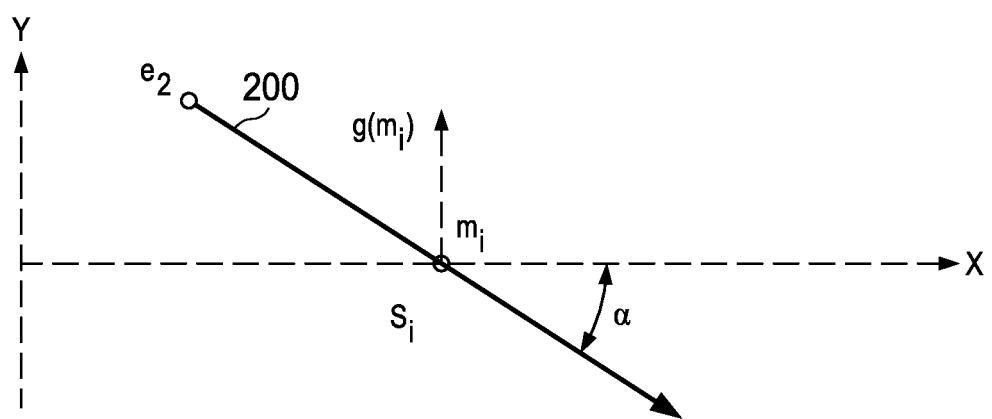
FIG. 2 is an illustration of an illustrative segment that is mathematically characterized.

With regard to FIG. 2, an illustration of an illustrative line segment 200 that is mathematically characterized as a vector $S_i$ is shown. A segment can be characterized by a descriptor that includes, but not limited to, a location (x and y coordinates on a midpoint $m_i$ on axes X and Y), an orientation $\alpha$ (angle with respect to the X axis) and a length $\|e_1-e_2\|$, where $e_1$ and $e_2$ are respectively endpoint and start point of the segment $S_i$. Additional descriptors, such as thickness, gradient, orientation, gradient magnitude, color information, may be utilized, as well, to further define features that are modeled by segments. The more descriptors that are utilized to describe a segment, the better the accuracy may be when performing pattern matching, as further described herein. The descriptors may be normalized. The descriptors of the segments may be created through the use of two-dimensional (2D) imaging. However, alternative embodiments may utilized three-dimensional (3D) imaging. The process by which model descriptors are described for 3D imaging may be different from those provided below that are created using 2D imaging.

In particular, and as understood in the art, a canonical (i.e. unique) orientation may be defined by computing a cross-product between the vector $m_i e_1$ and the gradient vector $g(m_i)$ computed on the midpoint $m_i$. The result of the cross-product is a vector normal to the plane containing both vectors. That is, the cross-product provides for a z-axis parameter of the segment. Depending on the sign of the resulting vector (i.e., if it points inward onto the image plane or outward from the image plane), a decision as to whether the endpoints $e_1$ and $e_2$ should be swapped or not.

II. Transformation Between a Model Segment and a Query Segment

Figure 3A:
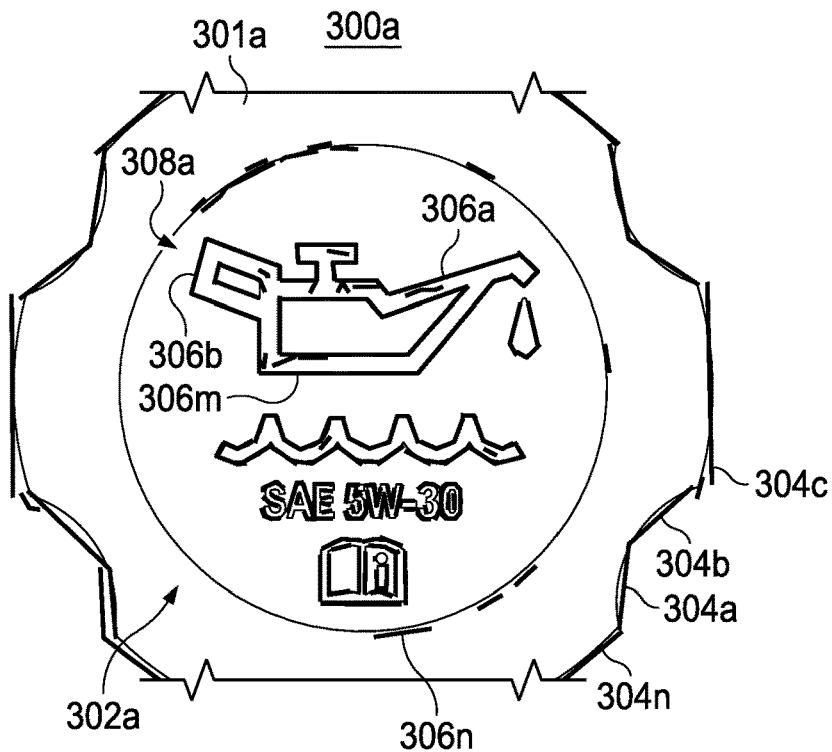
FIGS. 3A and 3B are illustrations of an illustrative template image and target image that is rotated relative to the template image on which model segments may be extracted to perform pattern matching in accordance with the principles described herein.

With regard to FIG. 3A, an illustration of an illustrative template image 300 on which model descriptors for model segments of an object 301 may be extracted is shown. The object 301 in this case is of a cap for an oil tank having a defined shape on which graphics and/or text 302a is printed and/or imprinted. A segment descriptors generator of a machine vision system may be configured to generate descriptors of segments 304a-304n (collectively 304) to model shape portions of the object and descriptors of segments 306a-306n (collectively 306) to model indicia printed or imprinted on the object 301. The descriptors of segments 304 and 306 may be considered model segment descriptors.

Figure 3B:
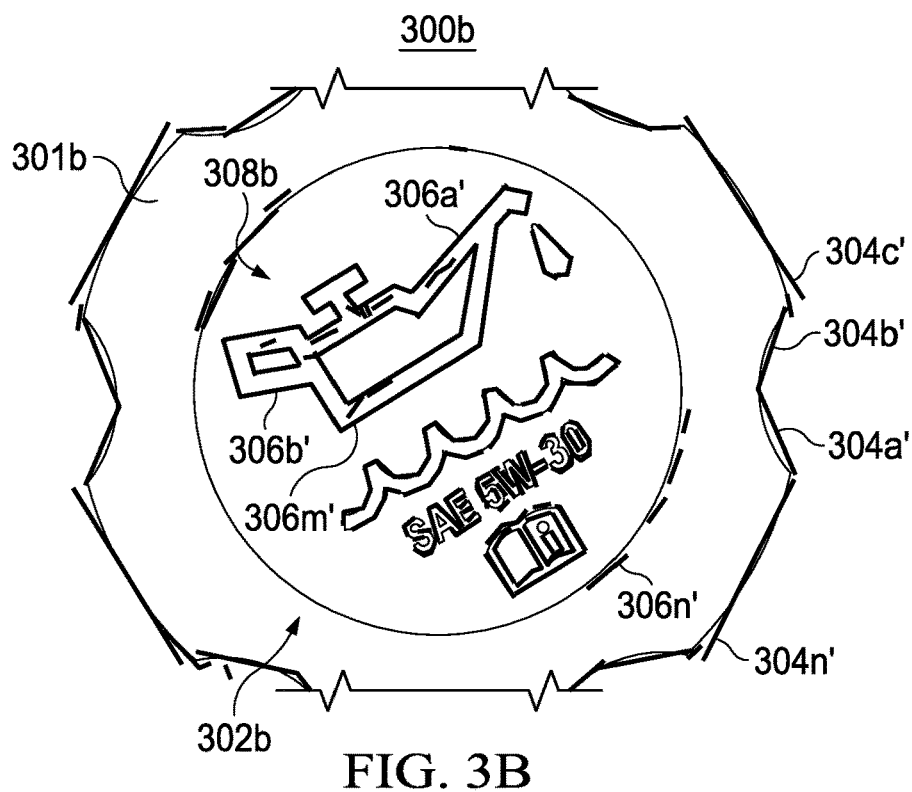

With regard to FIG. 3B, an illustration of an illustrative target or query image 300b on which descriptors of model segments of an object 301b may be extracted is shown. The object 301b is a copy of the cap 300a for an oil tank having the same defined shape on which graphics and/or text 302b is printed and/or imprinted. The object 301b is rotated relative to the object 301a shown the template image 300a of FIG. 3A. As with FIG. 3A, the segment descriptors generator of a machine vision system may be configured to generate descriptors of segments 304a'-304n' (collectively 304') to model shape portions of the object and descriptors of segments 306a'-306n' (collectively 306') to model indicia printed or imprinted on the object 301b. Segment 306a represents a top surface of a spout of an oil can graphic, and 306m represents a bottom surface of an oil can graphic 308a. The descriptors of segments 304 and 306 of FIG. 3A may be used to compare with the descriptors of segments 304' and 306' of FIG. 3B to determine whether the objects 301a and 301b are a match, as further described herein. A determination of the two images 300a and 300b may be made as a confidence percentage (e.g., 98%) based on how well the transformed descriptors of segments 304 and 306 match the descriptors of segments 304' and 306'.

Figure 3C:
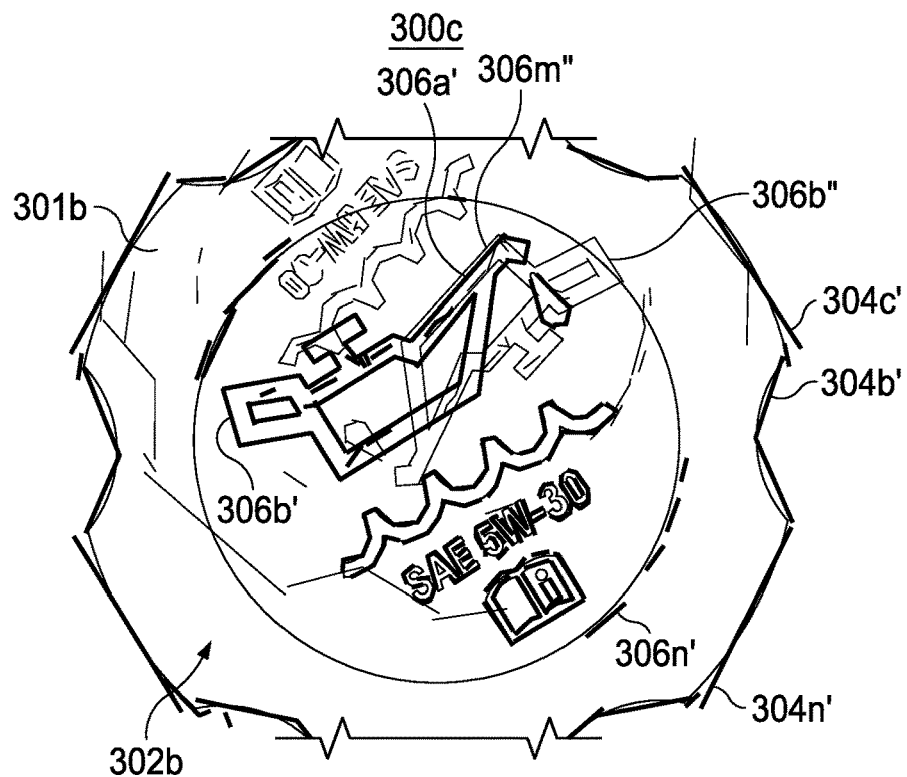
FIG. 3C is an illustration of a query image on which a transformation of model segments are shown to be misaligned with query segments of the query image as a result of non-corresponding model and query segments of FIGS. 3A and 3B being compared.

With regard to FIG. 3C, an illustration of an object image 300c of the object 301b is shown. As depicted on the object image 300c, model segment 306m (shown as transformed model segment 306m") and query segment 306a' that are extracted from the model image 300a and query image 300b of FIGS. 3A and 3B are shown to be non-corresponding when aligned with one another. That is, when performing a pattern match, a mathematical transformation may be computed that aligns the descriptor of a segment (e.g., segment 306m) onto another descriptor of a segment (e.g., segment 306a'), and determine whether some or all of the remainder of the model descriptors of respective model segments 304, 306 and query descriptors of respective query segments 304',306' match (i.e., are aligned to a minimum degree of certainty). In particular, since each segment is described by a descriptor including at least a location (x and y), an orientation ($\alpha$), and a length ($\|e_1-e_2\|$), four parameters are known and a scaled rotation, also known as similarity transform, may be computed by:

$$x' = [sR\ t]\tilde{x} = \begin{bmatrix} a & -b & t_x \\ b & a & t_y \end{bmatrix} \tilde{x}$$

with the four parameters being:
(a) x and y translation between the segment midpoints;
(b) rotation by the segment angle difference; and
(c) scaling by the length ratio.

Therefore, given a pair of corresponding segments (e.g., 306m and 306a'), the transformation that aligns the descriptors of model segment (e.g., 306m) onto the descriptors of query segment (e.g., 306a') produces an hypothesis of the transformation that incurs between the two images 300a and 300b. However, as shown in FIG. 3C, the pair of segments (e.g., 306m and 306a') may be incorrect, so a way to understand if the transformation of the descriptors is consistent among the other model segments (e.g., 304, 306 and 304',306') or not is to be created.

Given an hypothesis, a validation may be made by (i) transforming all or part of the remaining descriptors of the model segments 304, 306 and (ii) determining how well transformed descriptors of model segments 304, 306 align with descriptors of query image segments 304',306'. If the segment pair is wrong, the alignment may be determined to be bad and the hypothesis may be discarded.

More particularly with regard to FIG. 3C, if a pair of non-corresponding segments, such as model segment 306m and query segment 306a', are selected to be matched, the descriptors of model segment 306m may be used to create a transform, as previously described. In creating the transform, the length of the model segment 306m may be adjusted to match the length of the query segment 306a', and the orientation of the model segment 306m may be rotated to match the orientation of the query segment 306a'. The re-scaled and re-oriented model segment 306m is shown in FIG. 3C as segment 306m". Thereafter, other model segments, such as a subset of the model segments 304, 306, are re-oriented using the transform and compared against corresponding query segments 304',306'. As shown, after transformation of the descriptors of model segment 306b to form transformed descriptors of model segment 306b", there is no match between transformed descriptors of model segment 306b" with descriptors of query segment 306b'. As shown in FIG. 3C, the transformed descriptors result in the model segments 304, 306 aligning very badly with query segments 304',306'.

Figure 3D:
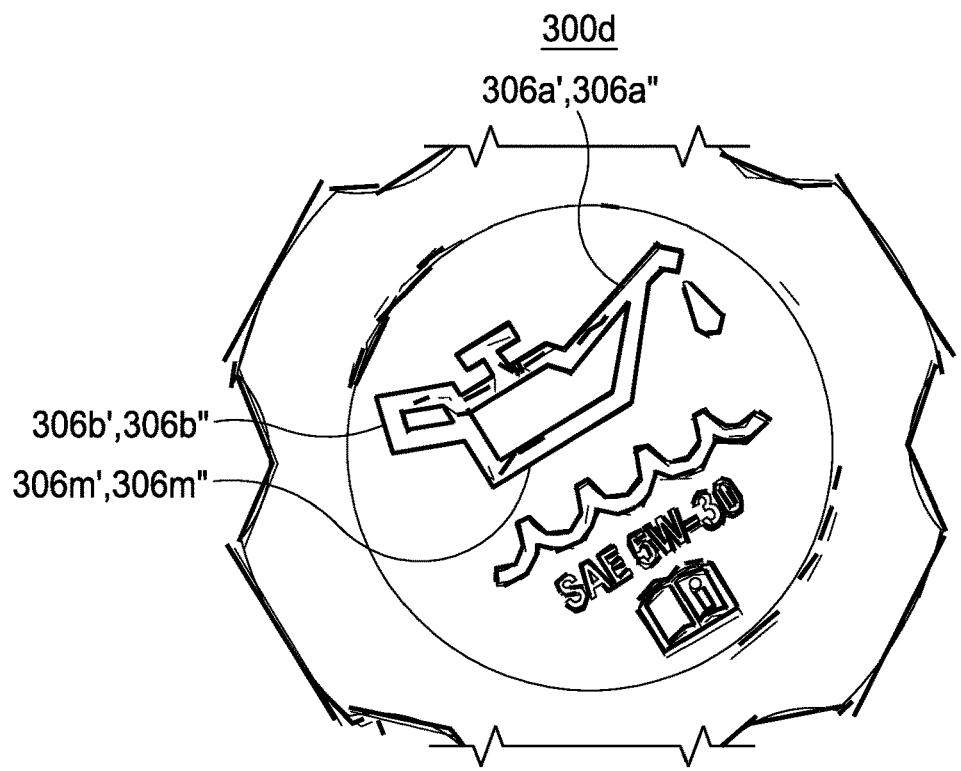
FIG. 3D is an illustration of a query image on which a transformation of model segments are shown to be aligned with query segments of the query image as a result of corresponding model and query segments of FIGS. 3A and 3B being compared.

With regard to FIG. 3D, an illustration of a query image 300d that matches query image 300b of FIG. 3B is shown. However, in this case, the model segment 306a is transformed to be transformed model segment 306a". The transformed descriptors of the model segment 306a" matches descriptors of the query segment 306a'. As a result of the match, transformed descriptors of the model segment 306b" matches descriptors of the query segment 306b' and descriptors of the transformed model segment 306m" matches descriptors of the query segment 306m'. In an embodiment, after transforming a subset of the model segments 304 and 306, all of the descriptors of the model segments 304 and 306 may be transformed and compared against all of the descriptors of the query segments 304' and 306'. As shown, the transformed model segments 304",306" match to the query segments 304',306', so it is determined that the descriptors of the query image 300d are a match of the descriptors of the model image 300a. Since the model segments 304, 306 and query segments 304',306' align well, a good hypothesis may be established.

III. Consensus-Based Hypotheses Validation

The validation of an hypothesis can be done using a model fitting algorithm. In particular, the random sample consensus (RANSAC) algorithm, which is a well-known method to robustly fit a model to observed data, may be employed. It should be understood that alternative model fitting algorithms may be utilized.

RANSAC works by computing the so-called consensus which represents the number of observations (i.e., transformed model segments) that are consistent (i.e., aligns well with corresponding query segment, also known as inliers) with a given transformation, while at the same time excluding outliers, which are observations that are distant (i.e., inconsistent) from the estimated model and which should be discarded without influencing the estimation.

In this case, the mathematical model is the transformation between the pair of segments while the outliers are segments present in the model, but not in the query image and vice versa.

Below is a pseudocode process that shows how RANSAC can be used for identifying a best transformation between segments of a template image and segments of a query image (i.e., transformation between descriptors of the segments):

Given a set of model segments M and a set of query segments Q.
MaxConsensus=0
BestTransform=0
For i=0 to N iterations (with N a parameter of the algorithm)
    Randomly select a pair of segments (one from M and one from Q, not selected in previous iterations).
    Compute the transformation that aligns the model descriptor of respective model segment to the query descriptor of respective query segment
    Transform all (or part) of remaining model descriptors
    For each transformed model descriptor:
        Find closest query descriptor
        If the transformed model descriptor and closest query descriptor are similar enough
        Increment consensus
    If current iteration consensus is higher than MaxConsensus
    Store consensus as MaxConsensus
    Store the transformation as BestTransform
At the end of the N iterations, BestTransform contains the transformation with the highest consensus. Nevertheless, the query image may not contain the model so the best transformation may still represent a bad hypothesis. For this reason, to accept BestTransform, MaxConsensus is to be higher than a given minimum consensus threshold $T_{min}$.

IV. Optimizations for Fast Validation

The process described above may be very slow if the goal is to find the best transformation with an acceptable high probability. Fortunately, there are a number of optimizations that may be utilized to reduce the search space. The below non-limiting list provide an illustrative set of optional optimization processes for reducing the search space.

1. First, a termination criteria may be defined based on an acceptability threshold (i.e., if the consensus is higher than a minimum acceptable threshold $T_c$, the current transform may immediately be returned). The threshold can be expressed as a percentage over the number of model segments. For example, if the consensus for a current iteration is over 50% (or other threshold value) of model segments, then a determination that an acceptable high probability may be made that a good transformation has been found, and the loop may be terminated early.

2. Second, instead of randomly selecting segment pairs, model segments may be sorted by decreasing length such that a search may be started from the longest model segments and descend downwards by order of length. As understood in the art, RANSAC typically works by randomly selecting the points because all observations have the same probability of generating a good hypothesis. However, in accordance with the principles described herein, the longer a segment is, the higher the probability of finding a good and more stable transformation with high consensus. Therefore, starting from the longest segments should end the iterative process earlier.

3. Third, for a given model segment, an hypothesis for each query segment does not have to be validated, but only for those model-query segment pairs that have a compatible length ratio. If, for example, a scale range is defined to be between 0.9 and 1.1, model-query segment pairs with a length ratio outside this range may be ignored.

4. Fourth, not all model segments have to be used. Instead, during training, the first M more stable segments (e.g., after sorting by length or using the gradient magnitude to evaluate the stability) may be retained so that at most M iterations are performed.

5. Fifth, when searching for the closest query descriptor to each transformed model descriptor, instead of an exhaustive brute-force search, as performed with conventional image or pattern matching processes, a kd-tree index structure that makes the search faster may be utilized. In particular, because model descriptors are transformed at each iteration, thus changing every time, the kd-tree may be constructed over query descriptors so that the kd-tree may be constructed once.

V. Multiple Model Search

Figure 4:
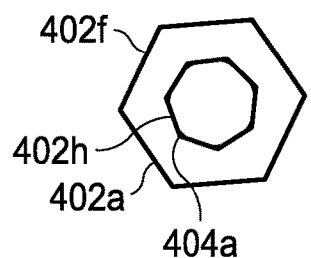
FIG. 4 is an illustration of an illustrative template image on which model segments may be extracted.

With regard to FIG. 4, an illustration of an illustrative template image 400 on which model segments 402a-402f (collectively 402) and model segments 404a-404h (model segments 404) may be extracted is shown. The template image 400 is that of a nut. However, it should be understood that the object or printed item may be of any shape, size, and/or texture. The model segments 402 may be formed around each of the features, including lines, graphics, letters, or otherwise. The model segments 402 and 404 may be generated through the use of a line segment detector algorithm, as understood in the art. In an embodiment, the line segment detector algorithm may be the Line Segment Detector (LSD) algorithm, as known in the art. Segment descriptors associated with the model segments 402 and 404 that are computed as a function of the extracted segments, as previously described, may carry more information than edges as segments are an aggregation of edges, and inherently include "richer" information. The use of these descriptors generally provides more robustness than edges when validating a transformation because of having more distinctive and compact information. Additionally, validation may be performed faster using segments than edges because wrong transformations are discarded earlier. Furthermore the number of segments extracted is far less than the number of edges therefore this further speeds up the validation process.

Figure 5:
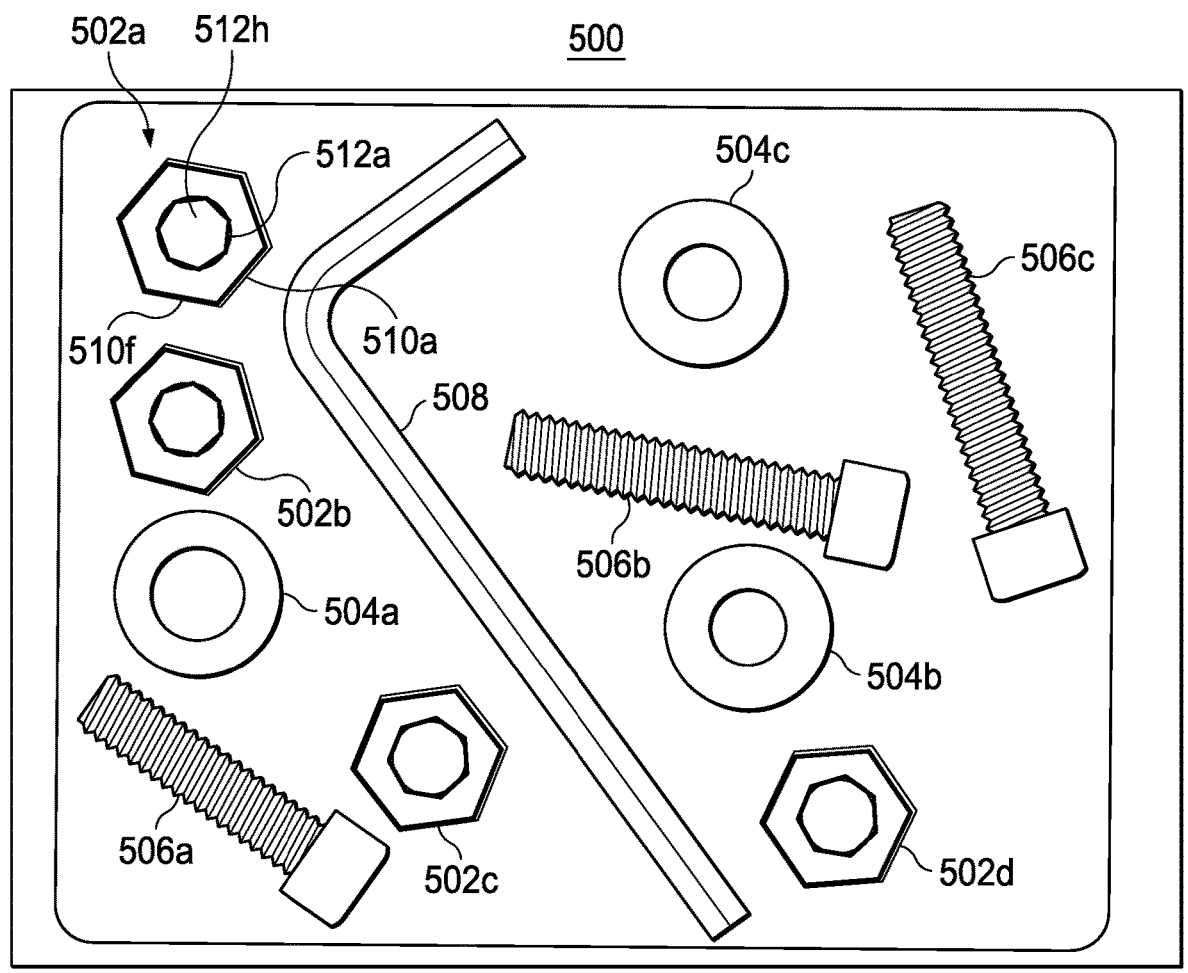
FIG. 5 is an illustration of an image on which a transformation of model segments determined from FIG. 4 may be applied to identify multiple matching images.

With regard to FIG. 5, an illustration of an image 500 on which a transformation of descriptors of model segments 402 and 404 determined from the image of FIG. 4 may be applied to identify multiple matching images. As shown, there are a number of different objects, including nuts 502a-502d, washers 504a-504c (collectively 504), bolts 506a-506c (collectively 506), and a pin 508. The nuts 502, which may be considered matching target or query images, match the template image 400 of FIG. 4, while the other objects, including the washers 504 do not. As previously described with regard to FIGS. 3B-3D, segments of features of the imaged objects may be generated using a line segment detector.

The base RANSAC algorithm is configured to use one model at a time. It is possible, however, to extend the algorithm to search for multiple model matches in an image, such as shown in image 500 of FIG. 5 (in the same query image), in two different non-limiting ways:

1. After a best transform is found, all query segments relative to the best transform may be removed from the list, and the iterative process may be started again. The model-query segment matching process may be repeated until the last MaxConsensus found is less than the minimum consensus threshold $T_{min}$(e.g., 50%) so no other good transformation is found.

2. Alternatively: the process may perform a loop over a subset or all model segments, and for each of the model segments, find corresponding query segments and test the corresponding transformation. In response to a good transformation being found, the good transformation may be collected in a list. After each of the model segments are processed, the list of good transformation(s) may be processed to remove possible duplicates and to sort by consensus.

The above illustrative processes are two ways to achieve multiple model search capability. It should be understood that more advanced techniques that extend directly using RANSAC to multiple model fitting, and could be employed within the pattern matching algorithm. This is an example of multiple model matches using the second option above.

With further regard to FIGS. 4 and 5, the pattern matching process as previously described may sort the model segments 402 and 404 by length. The model matching may thereafter perform the transformation process using the longest segments. In this case, the segments 402 that extend across the outside perimeter of the nut are determined to be the longest segments as compared to the inside perimeter segments 404 of the nut. From descriptors that describe the length and orientation of segments 510a-510f (collectively 510) of the nuts 502, the imaged nuts 502 are easily determined to be matches based on descriptors that describe the model segments 402 determined from the image 400, while the other objects 504, 506, and 508 are easily dismissed. In this case, because there are multiple matching images, either or both of the two illustrative processes provided above for performing multiple image searches may be utilized to identify the multiple matching images.

Figure 6:
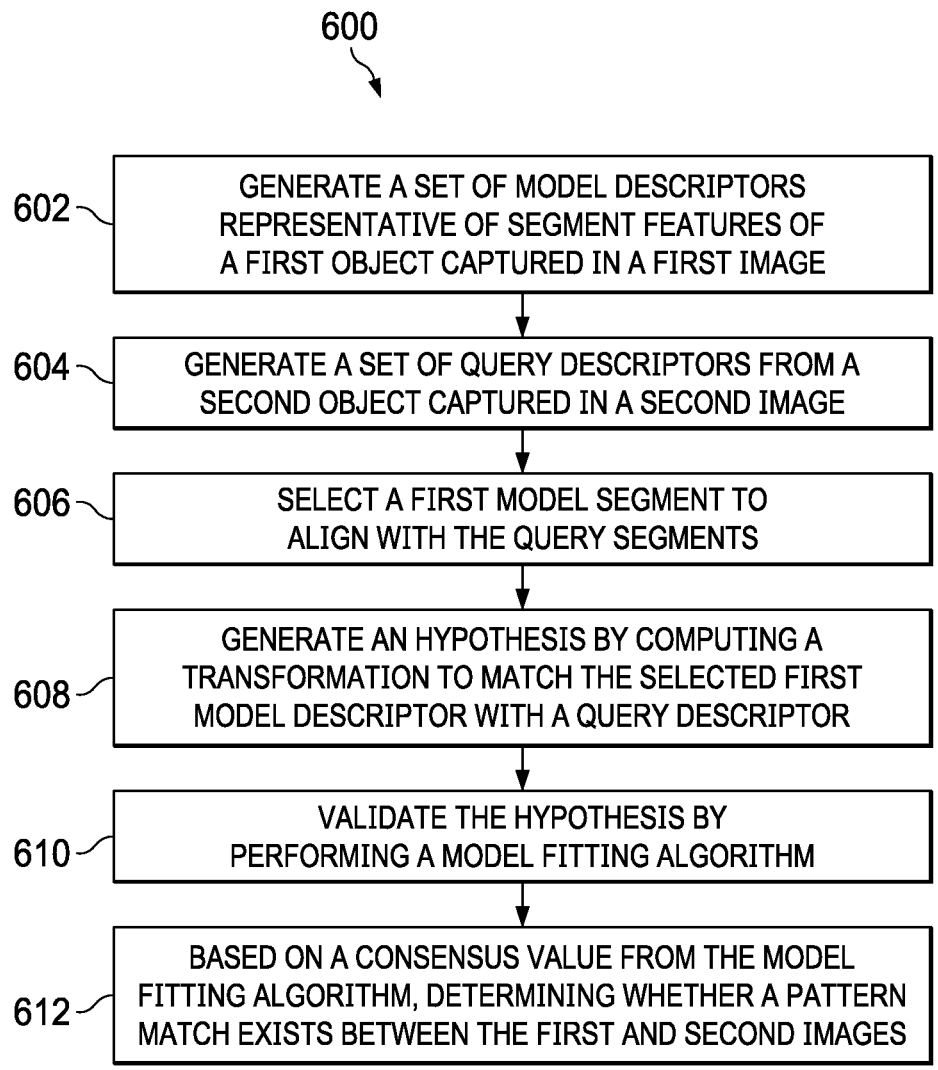
FIG. 6 is an illustration of an illustrative flow diagram for performing pattern matching in accordance with the principles described herein.

Trained Model:
Matches on query image:
Complete Algorithm Pseudo-Code
The below algorithm is a culmination and expansion of the previous algorithms.
Given:
L=minimum segment length
M=max number of model points to retain
Tl=loose minimum consensus threshold
Ts=strict minimum consensus threshold
Smin=minimum expected scale
Smax=maximum expected scale
Training (OFFLINE)
For each template image
Detect line segments
Compute length of each segment
Sort by length
Discard segments shorter than L
Retrain only first M model segments
Compute segment descriptors
Compute model midpoint
Runtime
Detect line segments on query image
Compute length of each segment
Discard short segments
Compute segment descriptors
Create a kd-tree over query segment descriptors for fast nearest neighbor search
CandidateMatchList=0
For each model
For i=0 to N, where N=min(max number of iterations requested, number of model descriptors)
Get i-th model segment (note that segment at index 0 is the longest)
For each query segment
If length ratio is greater than Smax
Continue
If length ratio is lower than Smin
Break (this is a lower bound because query segment are sorted)
Compute transformation that aligns model descriptor of respective model segment over query descriptor of respective query segment
For each remaining model descriptor
Transform the model descriptor
Find closest query descriptor by querying the kd-tree
If the model descriptor and query descriptor are similar enough
Increment consensus
If found consensus is higher than Tl
Add to CandidateMatchList
If only best match is needed and consensus is higher than Ts
Break
Sort CandidateMatchList by consensus
Filter out duplicate matches
Execute a Pose Refinement algorithm on remaining good candidate matches
Compute alignment scores by gradient similarity or by coverage measure With regard to FIG. 6, a flow diagram of an illustrative pattern matching process 600 in accordance with the embodiments described herein is shown. The process 600 may be computer-implemented (i.e., software executed on a computer) for matching a pattern. The process 600 may start at step 602, where a set of model descriptors representative of segment features of a first object captured in a first image may be generated. A set of query descriptors representative of segment features of a second object captured in a second image may be generated at step 604. At step 606, a first model segment may be selected to align with the query segments to determine if any of the query segments correspond with the first model segment based on respective model descriptors and query descriptors.

An hypothesis by computing a transformation to match the selected first model descriptor with a query descriptor may be generated at step 608. At step 610, the hypothesis may be validated by performing a model fitting algorithm when comparing other transformed model descriptors with other query descriptors. Based on a consensus value from the model fitting algorithm, a determination as to whether a pattern match exists between the first and second images may be made at step 612. In an embodiment, each of the steps 602-612 may be embodied in one or more software modules that are executed by a computer processor, where the computer processor may be any of, for example, a general processor, image processor, digital signal processor, ASIC, or combination thereof.

As previously described, one embodiment of a computer-implemented method for matching a pattern may include generating a set of model descriptors representative of segment features of a first object captured in a first image. A set of query descriptors representative of segment features of a second object captured in a second image may be generated. A first model segment may be selected to align with the query segments to determine if any of the query segments correspond with the first model segment based on respective model descriptors and query descriptors. An hypothesis may be generated by computing a transformation to match the selected first model descriptor with a query descriptor. The hypothesis may be validated by performing a model fitting algorithm when comparing other transformed model descriptors with other query descriptors. Based on a consensus value from the model fitting algorithm, a determination as to whether a pattern match exists between the first and second images may be made.

In an embodiment, the process may further include defining a termination criteria for the consensus value, and if the consensus value reaches or crosses the termination criteria, stop validation of the hypothesis may be stopped, otherwise, the validation of the hypothesis may be continued. Selecting a first model segment may include selecting a longest model segment based on corresponding first model descriptors. Validation of the hypothesis may include validation of the hypothesis with each query descriptor relative to a segment with a comparable length ratio between a minimum length ratio threshold and a maximum length ratio threshold.

The process may further include (i) sorting the model descriptors by length of the corresponding segments, and (ii) retaining a subset of model descriptors. Validating the hypothesis may include (i) searching for a closest query segment based on query descriptors, (ii) comparing the closest query segment with a closest transformed model segment based on transformed model descriptors, and (iii) determining whether the closest query and transformed model descriptors match, and if so, the consensus value may be increased, otherwise, the consensus value may be maintained. A kd-tree index structure may further be generated.

In an embodiment, generating a set of model descriptors may include defining a set of model descriptors by determining a location of a midpoint, an orientation angle relative to the x-axis, and a link between endpoints for each model segment. A unique orientation of each model descriptor may be determined by performing a cross-product of a segment vector between the midpoint and a first endpoint and a gradient vector.

In an embodiment, generating an hypothesis may include generating a scaled rotation matrix including midpoint translation, rotation, and scaling of the first model descriptors to match each set of query descriptors to test correspondence thereof. In one embodiment, generating hypotheses for each other model descriptor may be performed by generating transforms for each model descriptor for matching to each query segment.

In an embodiment, validating may include using a random sample consensus (RANSAC) with sorted model descriptors. The process may further include setting a minimum consensus threshold that the consensus value is to equal or cross in determining that a pattern match exists between the first and second images.

The process may further include determining if a current iteration consensus value is higher than a highest previous consensus value for each of the model descriptors used for matching the pattern. If the current generation consensus value is higher than the highest previous consensus value, then the consensus value may be stored as a maximum consensus value, and the transfer may be stored as a best transform.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of exemplary embodiments for implementing the invention, and the scope of the invention should not necessarily be limited by this description. The scope of the present invention is instead defined by the following claims.

What is claimed:

1. A computer-implemented method for matching a pattern, said the method comprising:
    generating a set of model descriptors representative of segment features of a first object captured in a first image;
    generating a set of query descriptors representative of segment features of a second object captured in a second image;
    selecting a first model segment to align with the query segments to determine if any of the query segments correspond with the first model segment based on respective model descriptors and query descriptors;
    generating a hypothesis by computing a transformation to match the selected first model descriptor with a query descriptor;
    validating the hypothesis by performing a model fitting algorithm when comparing other transformed model descriptors with other query descriptors with each query descriptor relative to a segment with a comparable length ratio between a minimum length ratio threshold and a maximum length ratio threshold; and based on a consensus value from the model fitting algorithm, determining whether a pattern match exists between the first and second images.

2. The method according to claim 1, further comprising:
defining a termination criteria for the consensus value; and
if the consensus value reaches or crosses the termination criteria, stop validating the hypothesis;
otherwise, continue validating the hypothesis.

3. The method according to claim 1, further comprising:
sorting the model descriptors by length of the corresponding segments;
retaining a subset of model descriptors; and
wherein selecting a first model segment includes selecting a longest model segment based on corresponding first model descriptors of the retained subset of model descriptors.

4. The method according to claim 1, wherein validating the hypothesis includes:
searching for a closest query segment based on query descriptors;
comparing the closest query segment with a closest transformed model segment based on transformed model descriptors;
determining whether the closest query and transformed model descriptors match, and if so, increase the consensus value, otherwise, maintain the consensus value.

5. The method according to claim 1, wherein generating a hypothesis includes generating a scaled rotation matrix including midpoint translation, rotation, and scaling of the first model descriptors to match each set of query descriptors to test correspondence thereof.

6. The method according to claim 5, further comprising generating hypotheses for each other model descriptor by generating transforms for each model descriptor for matching to each query segment.

7. The method according to claim 1, further comprising setting a minimum consensus threshold that the consensus value is to equal or cross in determining that a pattern match exists between the first and second images.

8. The method according to claim 1, wherein the model fitting algorithm is a random sample consensus (RANSAC) algorithm.

9. A computer-implemented method for matching a pattern, the method comprising:
generating a set of model descriptors representative of segment features of a first object captured in a first image including defining a set of model descriptors by determining a location of a midpoint, an orientation angle relative to the x-axis, and a link between endpoints for each model segment;
generating a set of query descriptors representative of segment features of a second object captured in a second image;
selecting a first model segment to align with the query segments to determine if any of the query segments correspond with the first model segment based on respective model descriptors and query descriptors;
generating a hypothesis by computing a transformation to match the selected first model descriptor with a query descriptor;
validating the hypothesis by performing a model fitting algorithm when comparing other transformed model descriptors with other query descriptors; and
based on a consensus value from the model fitting algorithm, determining whether a pattern match exists between the first and second images.

10. The method according to claim 9, further comprising determining a unique orientation of each model descriptor by performing a cross-product of a segment vector between the midpoint and a first endpoint and a gradient vector.

11. An imaging system, comprising:
an imaging camera;
a processing unit in communication with said imaging camera, and configured to:
generate a set of model descriptors representative of segment features of a first object captured in a first image and define a set of model descriptors by determining a location of a midpoint, an orientation angle relative to the x-axis, and a link between endpoints for each model segment;
generate a set of query descriptors from a second object captured in a second image;
select a first model segment to align with the query segments to determine if any of the query segments correspond with the first model segment based on respective model descriptors and query descriptors;
generate a hypothesis by computing a transformation to match the selected first model descriptor with a query descriptor;
validate the hypothesis by performing a model fitting algorithm when comparing other transformed model descriptors with other query descriptors; and
based on a consensus value from the model fitting algorithm, determine whether a pattern match exists between the first and second images.

12. The system according to claim 11, wherein the processing unit is further configured to:
define a termination criteria for the consensus value; and
if the consensus value reaches or crosses the termination criteria, stop validating the hypothesis;
otherwise, continue validating the hypothesis.

13. The system according to claim 11, wherein the processing unit, is further configured to:
sort the model descriptors by length of the corresponding segments;
retain a subset of model descriptors; and
in selecting a first model segment, the processing unit is further configured to select a longest model segment based on corresponding first model descriptors.

14. The system according to claim 11, wherein the processing unit, in validating the hypothesis, is configured to validate the hypothesis with each query descriptor relative to a segment with a comparable length ratio between a minimum length ratio threshold and a maximum length ratio threshold.

15. The system according to claim 11, wherein the processing unit, in validating the hypothesis, is configured to:
search for a closest query segment based on query descriptors;
compare the closest query segment with a closest transformed model segment based on transformed model descriptors; and
determine whether the closest query and transformed model descriptors match, and if so, increase the consensus value, otherwise, maintain the consensus value.

16. The system according to claim 11, wherein the processing unit is further configured to determine a unique orientation of each model descriptor by performing a cross-product of a segment vector between the midpoint and a first endpoint and a gradient vector.

17. The system according to claim 11, wherein the processing unit, in generating a hypothesis, is configured to generate a scaled rotation matrix including midpoint translation, rotation, and scaling of the first model descriptors to match each set of query descriptors to test correspondence thereof.

18. The system according to claim 17, wherein the processing unit is further configured to generate hypotheses for each other model descriptor by generating transforms for each model descriptor for matching to each query segment.

19. The system according to claim 11, wherein the processing unit is further configured to set a minimum consensus threshold that the consensus value is to equal or cross in determining that a pattern match exists between the first and second images.

20. The system according to claim 11, further comprising a laser marking system configured to perform direct part marking (DPM).

* * * * *